United States Patent
Ioannides et al.

(10) Patent No.: US 7,682,081 B2
(45) Date of Patent: Mar. 23, 2010

(54) SLIDING BEARING WITH IMPROVED SURFACE TOPOGRAPHY

(75) Inventors: Eustathios Ioannides, Wilnis (NL);
Hugh Alexander Spikes, London (GB);
Petra Brajdic-Mitidieri, London (GB);
Allen David Gosman, London (GB)

(73) Assignee: AB SKF, Gothenburg (CH)

( * ) Notice: Subject to any disclaimer, the term of this patent is extended or adjusted under 35 U.S.C. 154(b) by 772 days.

(21) Appl. No.: 10/567,855

(22) PCT Filed: Aug. 12, 2004

(86) PCT No.: PCT/EP2004/009096
§ 371 (c)(1), (2), (4) Date: Sep. 11, 2006

(87) PCT Pub. No.: WO2005/015035
PCT Pub. Date: Feb. 17, 2005

(65) Prior Publication Data
US 2007/0140608 A1    Jun. 21, 2007

(30) Foreign Application Priority Data
Aug. 12, 2003 (NL) ................................. 1024091

(51) Int. Cl.
*F16C 33/10* (2006.01)
(52) U.S. Cl. ........................ 384/12; 384/284; 384/13

(58) Field of Classification Search ............ 384/12, 384/13, 284, 293
See application file for complete search history.

(56) References Cited

U.S. PATENT DOCUMENTS

| | | | |
|---|---|---|---|
| 2,631,905 A | 3/1953 | Coppen | |
| 5,462,362 A * | 10/1995 | Yuhta et al. | 384/13 |
| 5,630,953 A * | 5/1997 | Klink | 219/121.69 |
| 6,046,430 A | 4/2000 | Etsion | |
| 6,095,690 A * | 8/2000 | Niegel et al. | 384/293 |
| 6,736,101 B2 * | 5/2004 | Kano et al. | 123/193.2 |
| 6,802,650 B2 * | 10/2004 | Yasuda et al. | 384/276 |

FOREIGN PATENT DOCUMENTS

DE    199 53 576 C2    6/2001

* cited by examiner

*Primary Examiner*—Thomas R Hannon
(74) *Attorney, Agent, or Firm*—Buchanan Ingersoll & Rooney PC

(57) ABSTRACT

A sliding bearing comprises two opposite bearing surfaces (3, 4) which enclose a gap (6) containing a lubricant film (5), the bearing surfaces (3, 4) being moveable with respect to each other in a generally parallel fashion, at least one of the surfaces (4) being provided with at least one cavity (10), the cavity having a depth (h3) which is at least equal to the lubricant film thickness. One of the length (Bp) and width (Lp) dimension of the surface area of the cavity (10) amounts to at least 100 μm.

16 Claims, 12 Drawing Sheets

SLIDING BEARING WITH IMPROVED SURFACE TOPOGRAPHY

This application is a U.S. national stage application based on International Application No. PCT/EP2004/009096 filed on Aug. 12, 2004, and claims priority under 35 USC 119 to Netherlands Application No. 1024091 filed on Aug. 12, 2003, the entire contents of which are incorporated herein by reference.

The invention is related to the field of sliding bearing contacts. Such sliding contacts are present in various locations of all sorts of machinery, and in particular in the bearing components thereof. As an example, reference is made to the contact between the cage and the rolling elements of a bearing, or between the rolling elements and the flange of a bearing ring of a tapered roller bearing.

Generally, it is desirable to reduce the friction in such sliding bearing contacts. A reduced friction enhances bearing life due to the lower temperatures which are generated in service within the bearing contact. This has a favourable influence on the properties of the lubricant whereby the desired lubricant film thickness in the bearing contact can be maintained. Thus, wear of the surfaces in the sliding contact can be kept within acceptable limits.

U.S. Pat. No. 6,046,430 discloses a sliding bearing comprising two opposite bearing surfaces which enclose a gap containing a lubricant film, said bearing surfaces being moveable with respect to each other in a generally parallel fashion, at least one of said surfaces being provided with at least one cavity, said cavity having a depth which is at least equal to the lubricant film thickness.

In particular, said publication discloses a method for designing load-bearing surfaces of bearings. Said surfaces are improved by the presence of micropores with a diameter of maximally 90 µm.

The object of the invention is to provide a sliding bearing having a reduced friction between the sliding surface. Said object is achieved in that at least one of the length and width dimension of the surface area of said cavity amounting to at least 100 µm.

Prefarably, at least one of the length and width dimensions amounts to at least 1000 µm. More preferably, at least one of the length and width dimensions amounts to at least 5000 µm (FIGS. 5, 6).

Preferably, the cavity depth is at least equal to 10 times the lubricant film thickness. Even better results are obtained in case the cavity depth is at least equal to 20 times the lubricant film thickness. A cavity depth up to 30 times the lubricant film thickness about represents the embodiment which still has a noticeable useful contribution to friction reduction.

Furthermore, it appears to be favourable in case the sum of the surface areas of all cavities of one and the same bearing surface amounts to at least 15% of the contact area of the bearing surfaces. On the other hand, the sum of the surface areas of all cavities of one and the same bearing surface should amount to at most 50% of the contact area of the bearing surfaces.

Furthermore, it appears to be useful in case the total cavity area is distributed over more than one cavity. Preferably, at least one of the surfaces has at least 4 cavities. Furthermore, at most 8 cavities should be applied.

In case one and only one cavity is provided, said cavity is preferably positioned approximately at equal distances from the inlet and the outlet.

In case at least two cavities are provided, the distance between the formost cavity and the inlet is preferably larger than the distance between the rearmost cavity and the outlet.

The center of a cavity or of a group of cavities may be located at a distance of 0.6 to 0.8 times the bearing length from the inlet.

Under running conditions, the lubricant film thickness may be in the range of 0.01 µm to 10 µm.

The invention will now be described further with reference to several examples of a sliding bearing.

Figure 1:
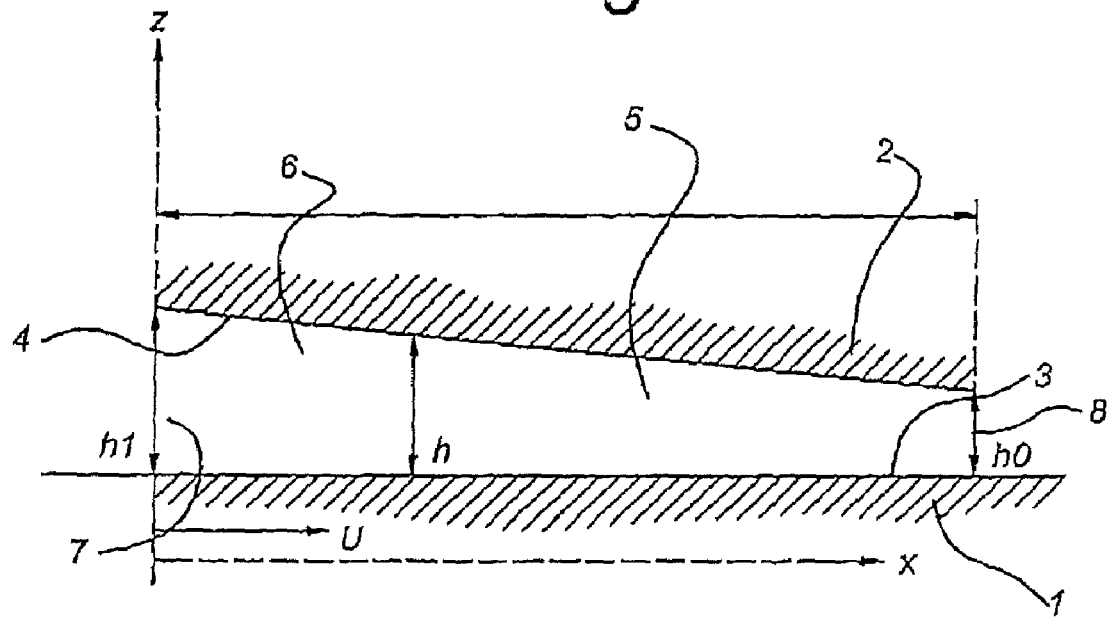
FIG. 1 shows a longitudinal section through a linear wedge type sliding bearing according to the state of the art.

In FIG. 1, a so-called infinitely long linear wedge of a prior art sliding bearing is shown. This sliding bearing has a lower member 1 and an upper member 2, which define respectively a lower bearing surface 3 and an upper bearing surface 4. Between the surfaces 3, 4, a film 5 of a suitable lubricant, e.g. an oil, is enclosed. It is assumed that the lower member 1 moves into the right direction with respect to the upper member 2 in FIG. 1. As a result, there is a movement of the film 5 through the gap 6 defined between the members 1, 2. In particular, the lubricant film 5 moves through the gap 6 from the inlet 7 thereof towards the outlet 8.

As will be clear from FIG. 1, at the entrance 7 the maximum thickness of the film 5 is $h_1$, and at the outlet 8 $h_0$. The length of the sliding bearing and thus of the gap 6 is indicated by B. The velocity of the lower member 1 with respect to the upper member 2 is indicated by U. The Cartesian coordinates x and z have been indicated as well.

It is observed that FIG. 1 is related to a two-dimensional case, which means that no account is taken of the other Cartesian coordinate y.

The friction coefficient is defined as $$\mu = \frac{F}{W}$$

and by expressing the friction coefficient through dimensionless values for load and friction, the following formula is obtained:

$$\mu = \frac{h_o}{B} \frac{F^*}{6W^*}$$

Figure 3:
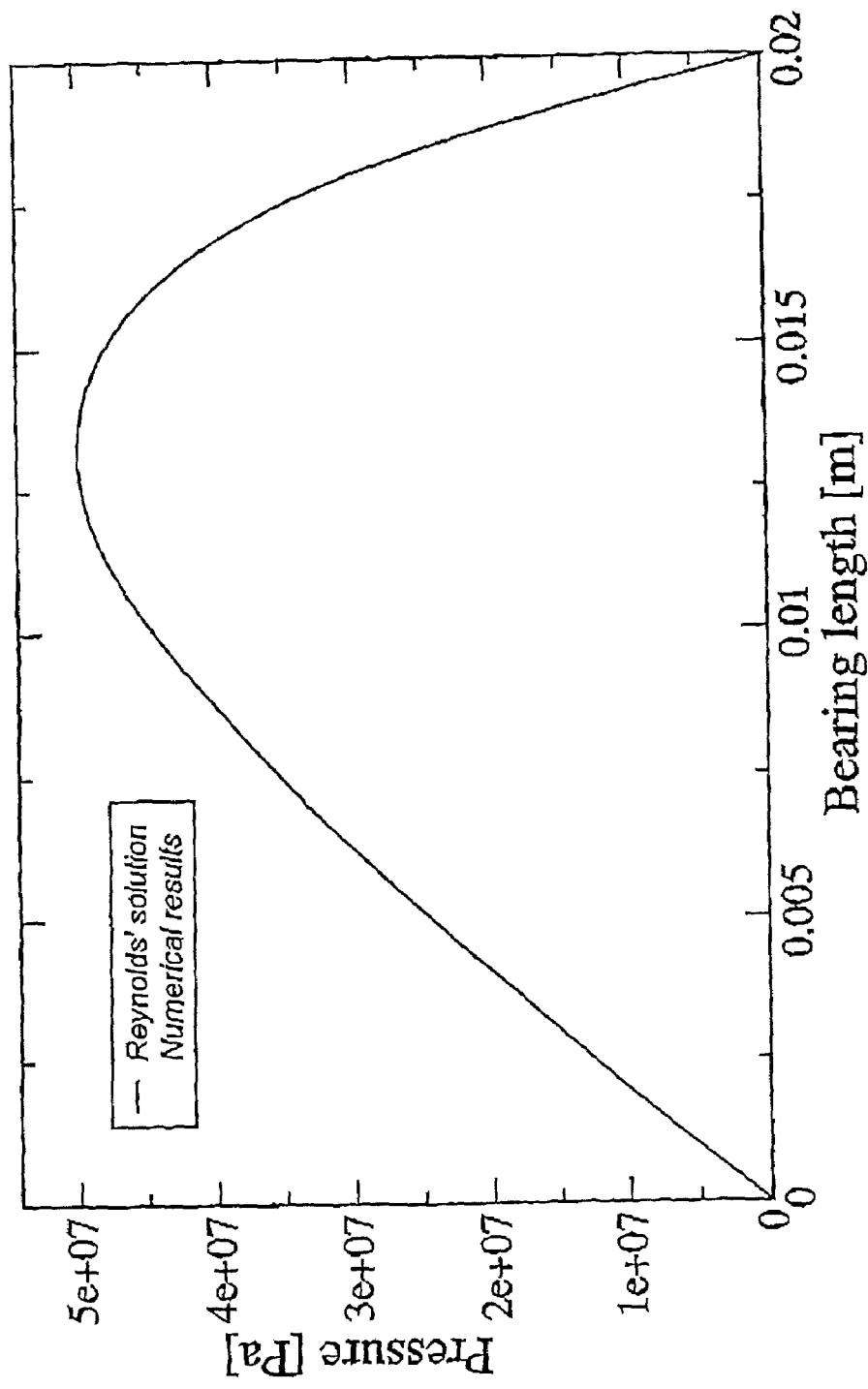
FIG. 3 shows a graph containing the pressure as function of the length along the bottom wall of the sliding bearing according to FIG. 2.

FIG. 3 shows the pressures on the bottom wall for the two-dimensional linear wedge according to FIG. 1, both obtained from the prior art Reynolds' solution given before as well as from numerical results obtained by computational fluid dynamics computations according to the invention.

Figure 2:
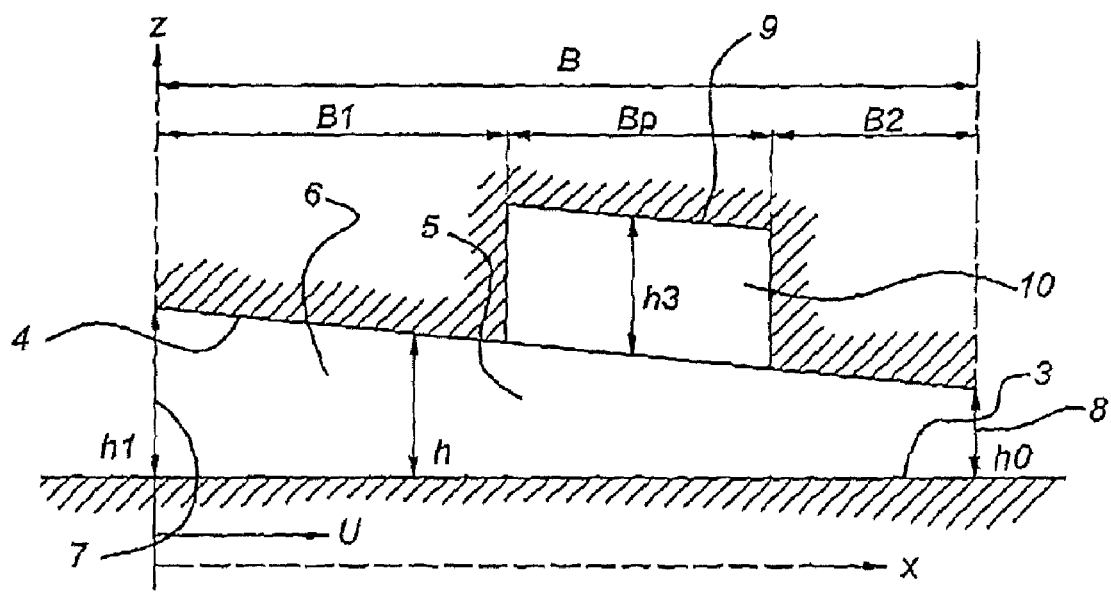
FIG. 2 shows a longitudinal cross-section through a sliding bearing according to the invention.
Figure 4:
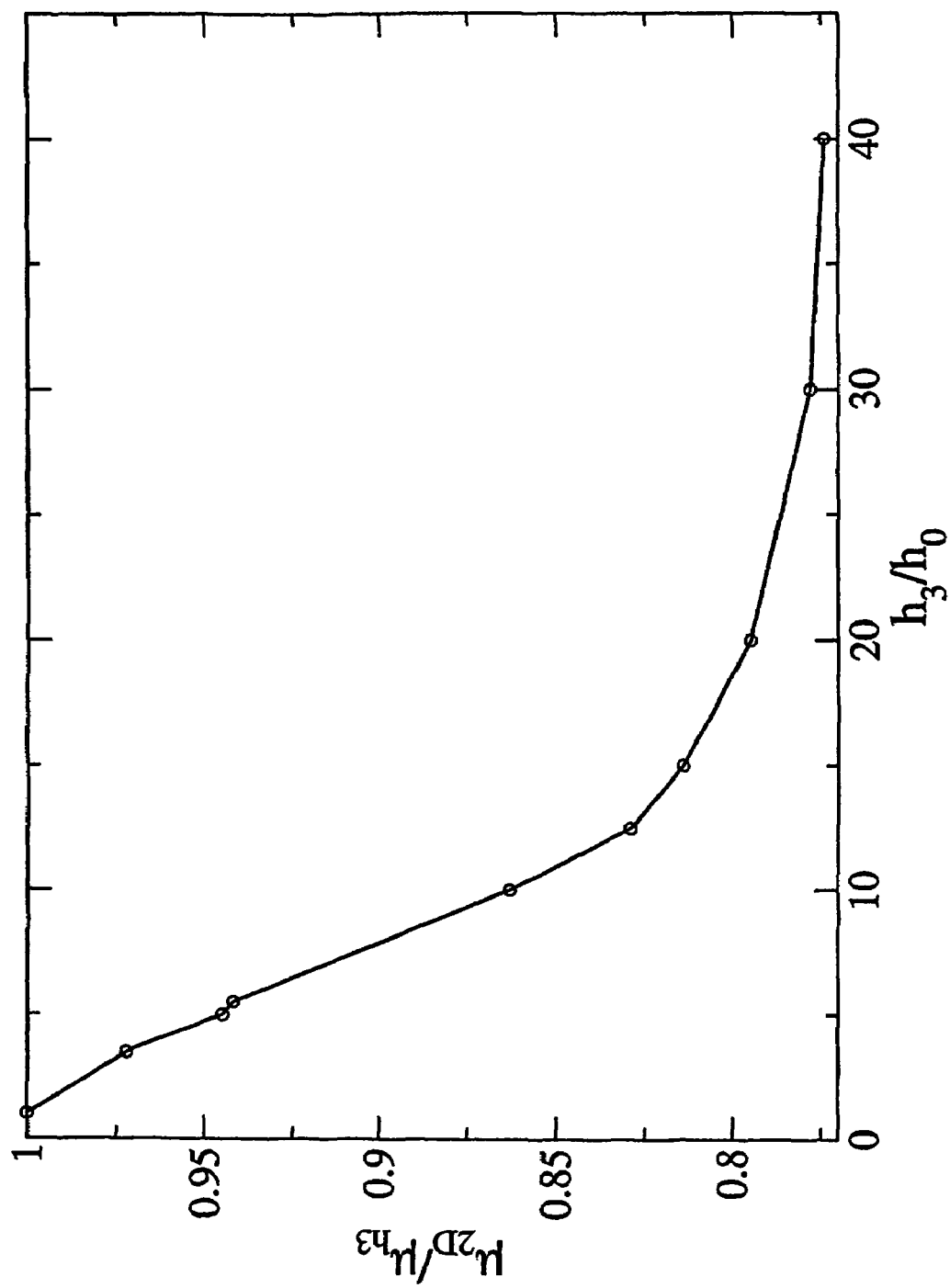
FIG. 4 shows a graph containing the dependence of the friction coefficients on the depth of the cavity of the sliding bearing according to FIG. 2.

In the embodiment according to FIG. 2, a cavity defined by a depth $h_3$, is present in the upper surface 4. Table 1 provides the results for the case wherein the top wall 9 of the cavity 10 is parallel to the moving wall. Moreover, it has been assumed that the upper surface 4 of the gap 7 is parallel to the moving bottom wall 3. As there is no analytical solution for this geometry, only numerical results for the total load and for the total friction are available. These results are given in table 1. From this table 1 and from FIG. 4 it is clear that the friction coefficient drops as the height of the cavity $h_3$ increases.

TABLE 1

| Height of the cavity [m] $H_3$ | Load [mPa] W/L | Friction [mPa] F/L | Dimless load W* | Dimless friction F* | Friction coeff. $\mu$ | Coeff. ratio $\mu/\mu_{2DRey}$ |
|---|---|---|---|---|---|---|
| 2D (Reynolds) | 635544 | 154.518 | 0.0265 | 0.773 | 2.431e−4 | 1 |
| 2D(CFD) | 630643 | 150.221 | 0.0263 | 0.751 | 2.382e−4 | 0.980 |
| 2D(CFD) | 633435 | 152.435 | 0.0264 | 0.762 | 2.406e−4 | 0.990 |
| 2D(CFD) | 634212 | 153.143 | 0.0264 | 0.766 | 2.415e−4 | 0.993 |
| 3.5 · 10⁻⁶ | 625077 | 144.771 | 0.0260 | 0.724 | 2.316e−4 | 0.953 |
| 5 · 10⁻⁶ | 618906 | 139.261 | 0.0258 | 0.696 | 2.250e−4 | 0.926 |
| 5.5 · 10⁻⁶ | 618006 | 138.751 | 0.0258 | 0.694 | 2.245e−4 | 0.923 |
| 10 · 10⁻⁶ | 612759 | 125.923 | 0.0255 | 0.630 | 2.055e−4 | 0.845 |
| 12.5 · 10⁻⁶ | 611860 | 120.851 | 0.0255 | 0.604 | 1.975e−4 | 0.812 |
| 15 · 10⁻⁶ | 611353 | 118.494 | 0.0255 | 0.592 | 1.938e−4 | 0.797 |
| 20 · 10⁻⁶ | 610857 | 115.625 | 0.0255 | 0.578 | 1.893e−4 | 0.779 |
| 30 · 10⁻⁶ | 610466 | 113.148 | 0.0254 | 0.566 | 1.853e−4 | 0.762 |
| 40 · 10⁻⁶ | 610340 | 112.56 | 0.0254 | 0.563 | 1.844e−4 | 0.759 |

In a further case, it is assumed that the top wall 9 of the cavity 10 is parallel to the stationary wall 4. The results of this case are presented in table 2.

TABLE 2

| Height of the cavity [m] $H_3$ | Load [mPa] W/L | Friction [mPa] F/L | Dimless load W* | Dimless friction F* | Friction coeff. M | Coeff. ratio $\mu/\mu_{2DRey}$ |
|---|---|---|---|---|---|---|
| 0 | 634212 | 153.143 | 0.0264 | 0.766 | 2.42e−04 | 0.993 |
| 3.5 · 10⁻⁶ | 625196 | 144.504 | 0.026 | 0.723 | 2.31e−04 | 0.951 |
| 5 · 10⁻⁶ | 618963 | 139.932 | 0.0258 | 0.7 | 2.26e−04 | 0.93 |
| 5.5 · 10⁻⁶ | 617726 | 137.749 | 0.0257 | 0.0689 | 2.23e−04 | 0.917 |
| 10 · 10⁻⁶ | 612755 | 124.579 | 0.0255 | 0.623 | 2.03e−04 | 0.836 |
| 12.5 · 10⁻⁶ | 611845 | 120.992 | 0.0255 | 0.605 | 1.98e−04 | 0.814 |

TABLE 2-continued

| Height of the cavity [m] $H_3$ | Load [mPa] W/L | Friction [mPa] F/L | Dimless load W* | Dimless friction F* | Friction coeff. M | Coeff. ratio $\mu/\mu_{2DRey}$ |
|---|---|---|---|---|---|---|
| 15 · 10⁻⁶ | 611395 | 118.595 | 0.0255 | 0.593 | 1.94e−04 | 0.798 |
| 20 · 10⁻⁶ | 610866 | 115.684 | 0.0255 | 0.578 | 1.89e−04 | 0.779 |
| 30 · 10⁻⁶ | 610485 | 113.177 | 0.0254 | 0.566 | 1.85e−04 | 0.763 |
| 40 · 10⁻⁶ | 610340 | 112.58 | 0.0254 | 0.563 | 1.85e−04 | 0.759 |

Figure 5:
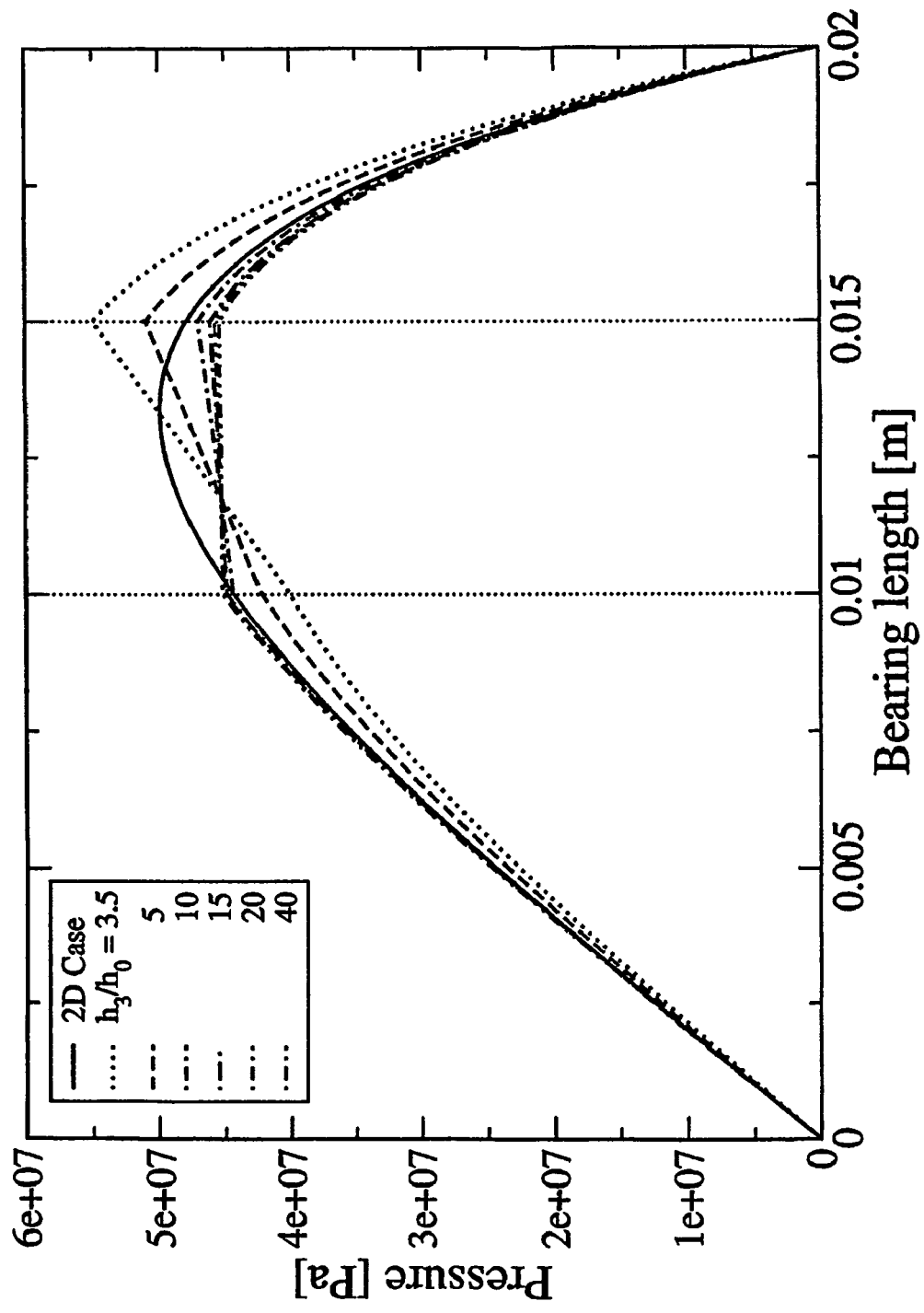
FIG. 5 shows a graph containing the pressure distribution for all cases, as well as for the two-dimensional Reynolds case, along the lower surface.
Figure 6:
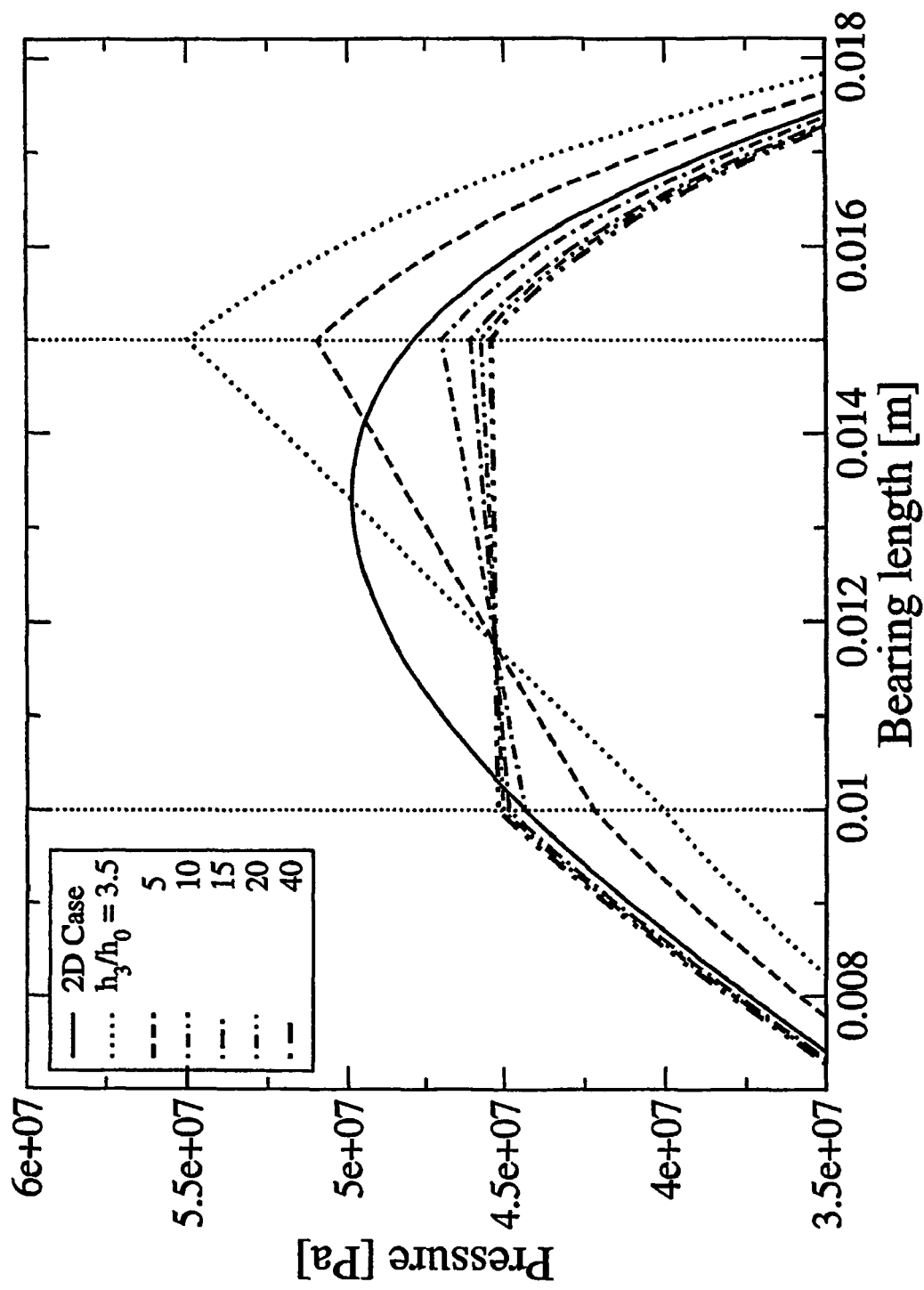
FIG. 6 shows a detail on a larger scale of FIG. 5.

FIG. 5 shows the pressure distribution along the bottom wall for all cases which are listed in table 1. FIG. 6 shows the region around the maximum pressures of FIG. 5 on an enlarged scale.

Figure 7:
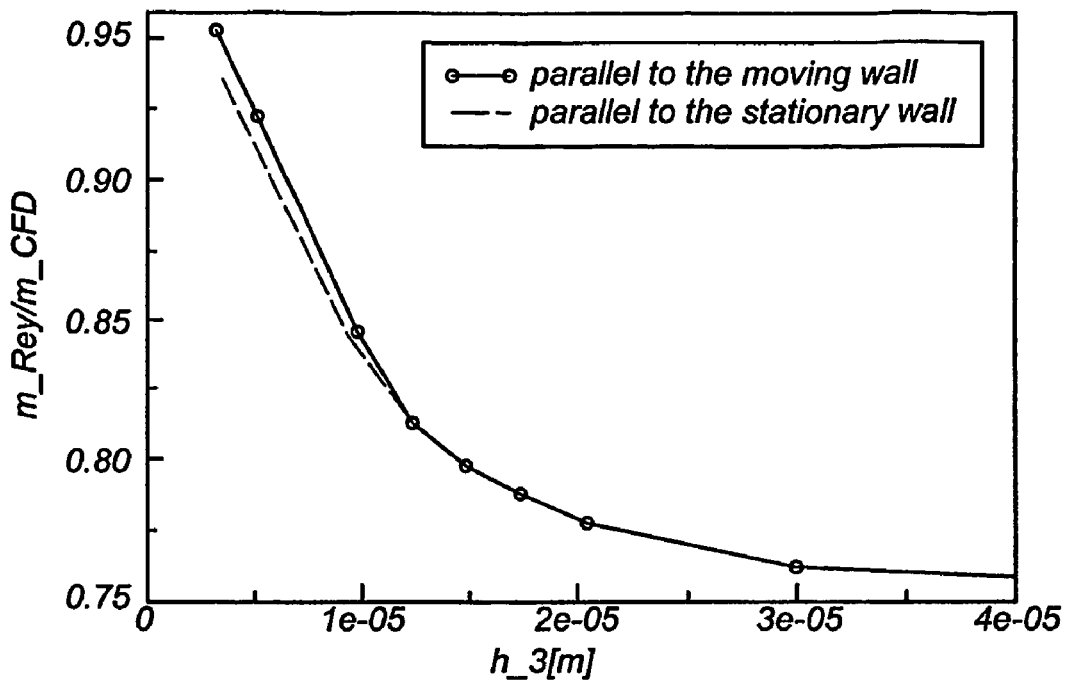
FIG. 7 shows a graph comparing the friction coefficients for all cases for both the top wall of the cavity parallel to the stationary upper surface and parallel to the lower, moving surface.

FIG. 7 shows a comparison between the friction coefficient for the case with the top wall 9 of the cavity 10 parallel to the stationary upper surface 4, and with the top wall 9 of the cavity 10 parallel to the moving lower surface 3. It is noted that in the case of shallow cavities minor differences occur between these cases, but that for the case of deep cavities 10 the results are very similar.

Figure 8:
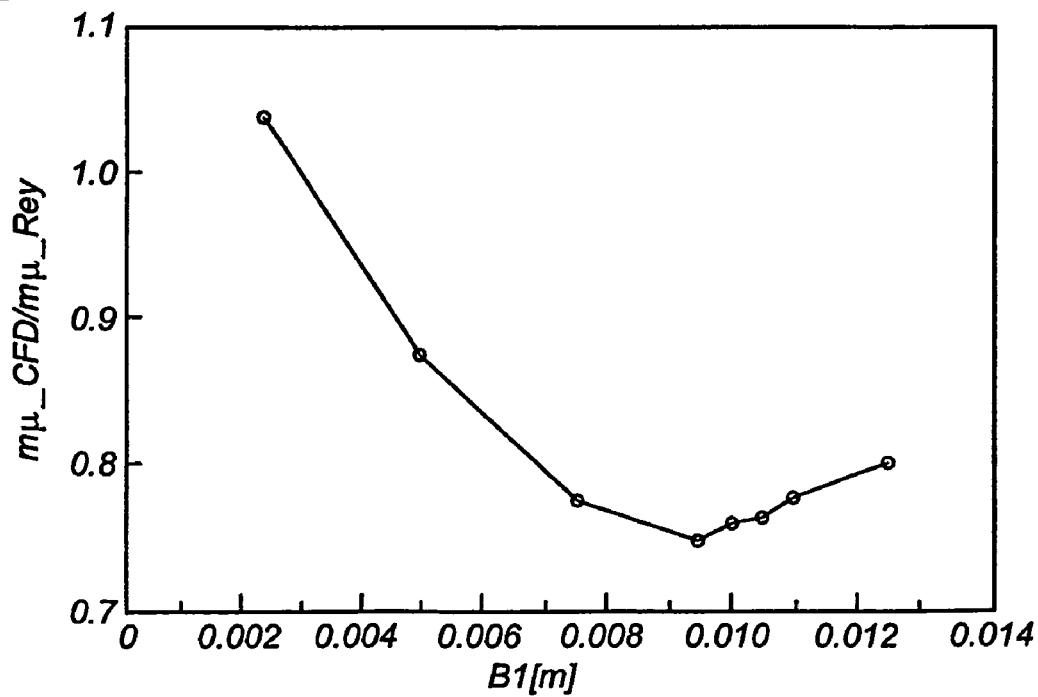
FIG. 8 shows a graph containing the friction coefficient ratio for different positions of the cavity.

Furthermore, the effect of the location of the cavity 10 as defined by the distance $B_1$ has been studied. Table 3 shows the results for calculated load, friction and friction coefficient. From this table 3 it is clear that the position $B_1$ at which the friction coefficient is minimal is around the middle of the length of the gap 6. This effect is also clearly shown in FIG. 8.

Figure 9:
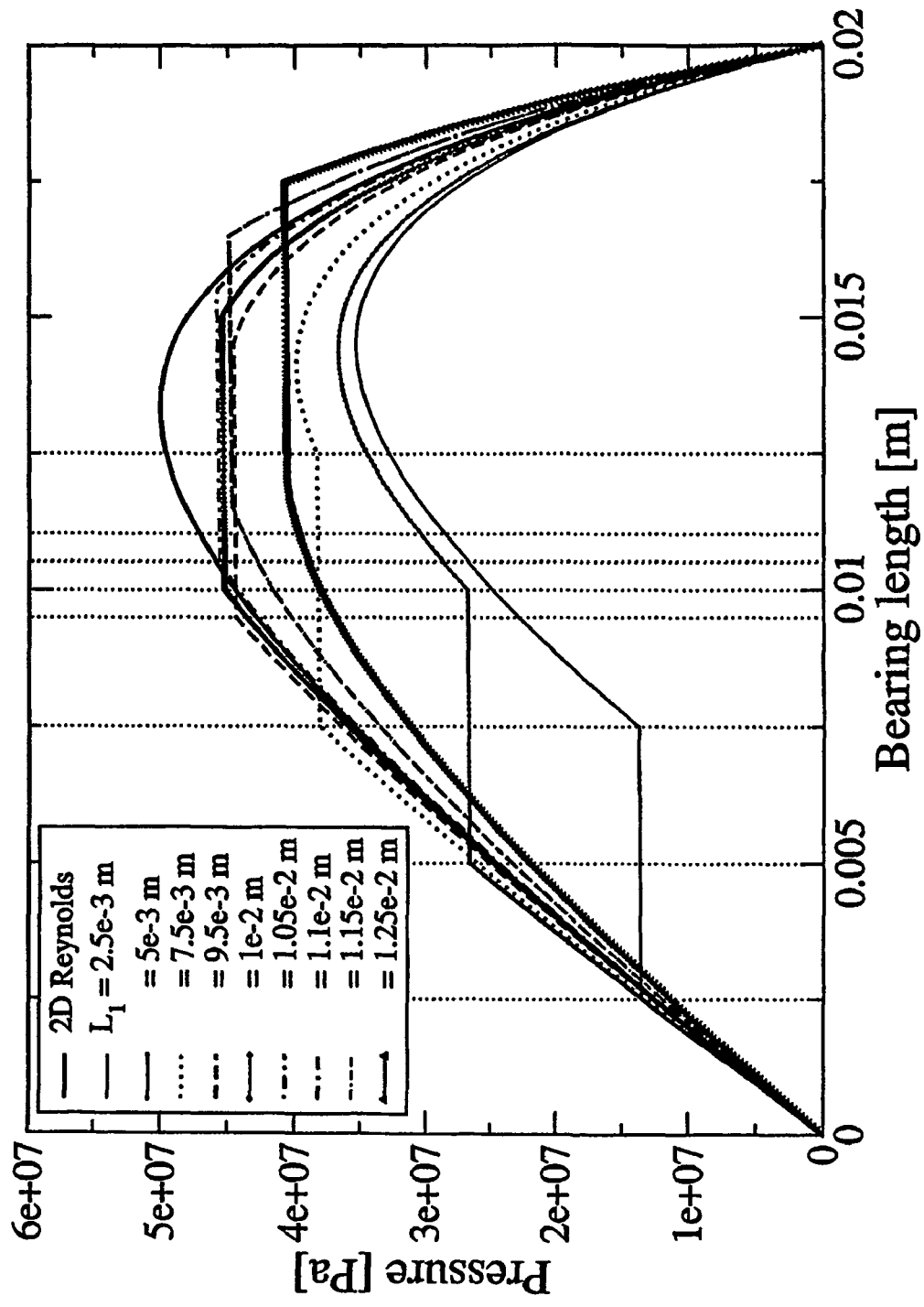
FIG. 9 shows a graph containing the pressure distribution for all cases including the two-dimensional Reynolds case with the pocket in different positions.

The pressure distribution for these cases and the two-dimensional Reynolds' case along the lower surface 3 is shown in FIG. 9.

TABLE 3

| Position of the cavity [m] $B_1$ | Load [mPa] W/L | Friction [mPa] F/L | Dimless load W* | Dimless friction F* | Friction coeff. $\mu$ | Coeff. ratio $\mu/\mu_{2DRey}$ |
|---|---|---|---|---|---|---|
| 0.25 · 10⁻² | 401814 | 101.185 | 0.0167 | 0.506 | 2.518e−4 | 1.036 |
| 0.5 · 10⁻² | 482803 | 102.464 | 0.0201 | 0.512 | 2.122e−4 | 0.873 |
| 0.75 · 10⁻² | 560142 | 105.37 | 0.0233 | 0.527 | 1.881e−4 | 0.774 |
| 0.95 · 10⁻² | 604587 | 109.992 | 0.0252 | 0.550 | 1.819e−4 | 0.748 |
| 1 · 10⁻² | 610340 | 112.580 | 0.0254 | 0.563 | 1.845e−4 | 0.759 |
| 1.05 · 10⁻² | 612709 | 113.656 | 0.0255 | 0.568 | 1.854e−4 | 0.763 |
| 1.10 · 10⁻² | 610825 | 115.214 | 0.0255 | 0.576 | 1.886e−4 | 0.776 |
| 1.25 · 10⁻² | 566752 | 110.209 | 0.0236 | 0.551 | 1.945e−4 | 0.800 |

Figure 10:
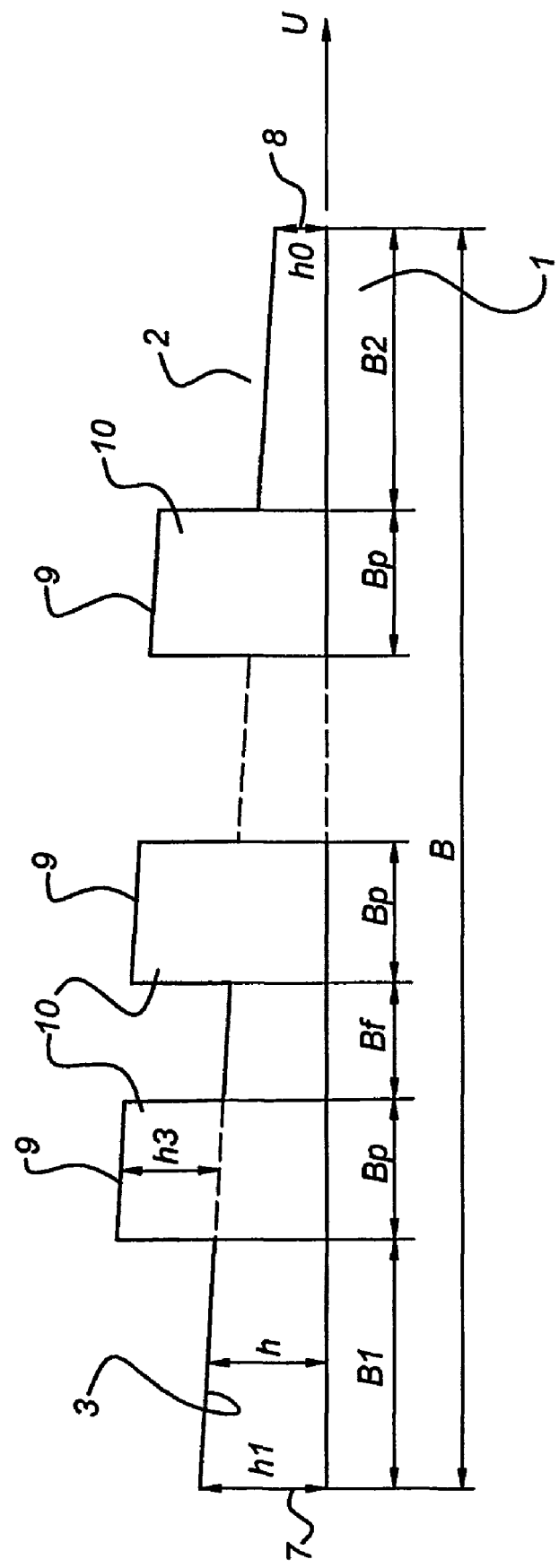
FIG. 10 shows a longitudinal cross-section through a sliding bearing with multiple cavities.

In the case of FIG. 2, a single cavity 10 is present in the stationary upper surface 4, covering about 25% of the total length B of the sliding bearing. In a further case shown in FIG. 10, four cavities 9 having a length $B_p$ have been applied, also covering about 25% of the total length B of the sliding bearing. The cavities are evenly spaced at distances $B_f$. Three different cases have been studied, each having an other distance $B_1$ for the first cavity 10 from the inlet 7 of the gap 6. The results for these three cases are presented in table 4.

TABLE 4

| Position of the cavity [m] $B_1$ | Load [mPa] W/L | Friction [mPa] F/L | Dimless load W* | Dimless friction F* | Friction coeff. $\mu$ | Coeff. ratio $\mu/\mu_{2DRey}$ |
|---|---|---|---|---|---|---|
| $1.875 \cdot 10^{-3}$ even spacing | 487415 | 112.161 | 0.0203 | 0.561 | 2.301e−4 | 0.947 |
| $2.5 \cdot 10^{-3}$ | 472362 | 102.226 | 0.0197 | 0.511 | 2.164e−4 | 0.890 |
| $7 \cdot 10^{-3}$ | 580376 | 109.345 | 0.0241823 | 0.546726 | 1.884e−4 | 0.775 |

Figure 11:
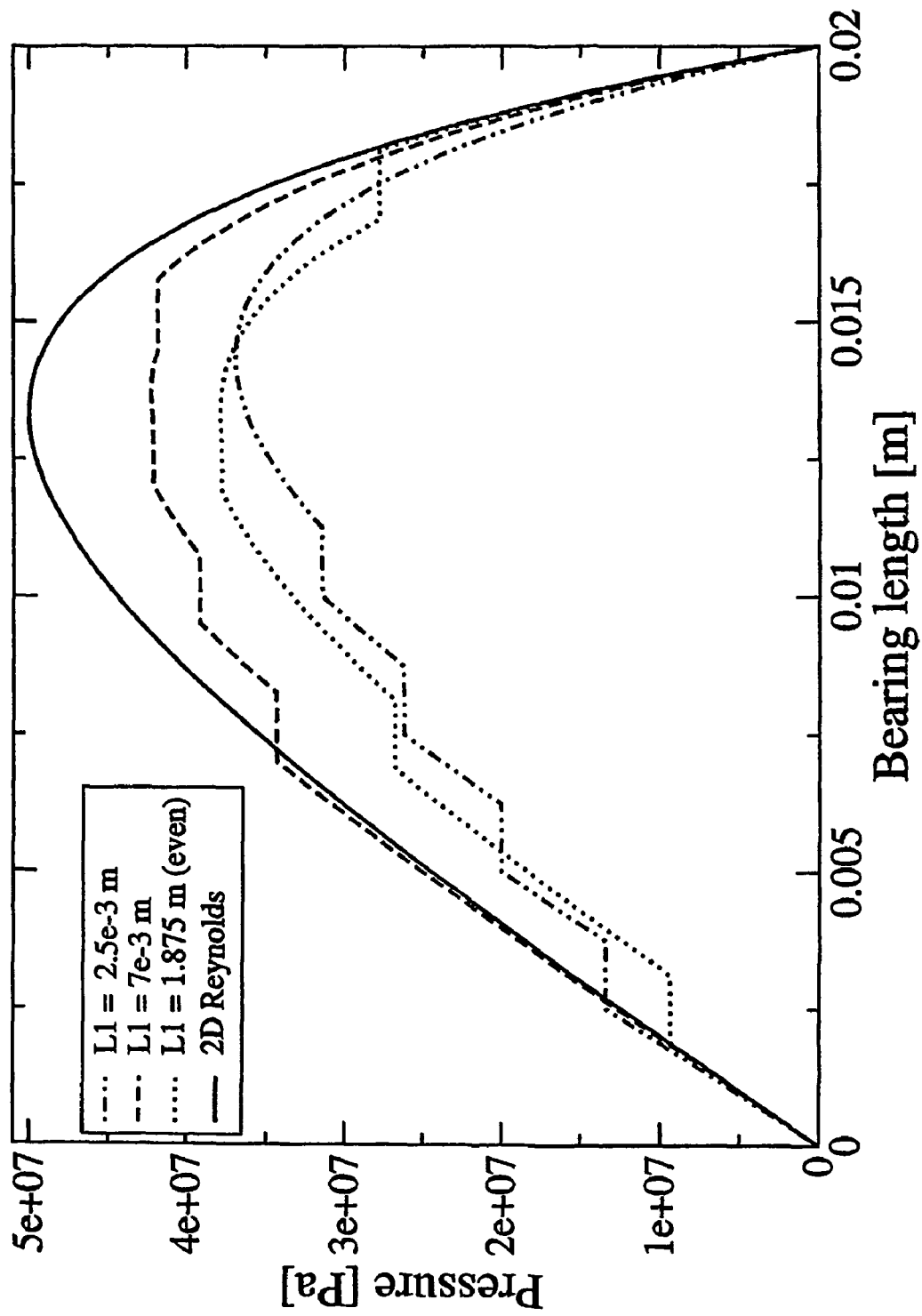
FIG. 11 shows a graph containing the pressure distribution for cases with four pockets, including the two-dimensional Reynolds case, wherein the cavity area is 25% of the total area.

The pressure distribution for these three cases along the lower surface 4 is presented in FIG. 11, together with the two-dimensional Reynolds case. It is clear that a smaller distance $B_1$ from the first cavity 10 to the inlet 7 does not lead to a reduction in the friction coefficient.

A further case was studied, provided with eight cavities 10 having a length $B_p$ which total to about 50% of the length B of the sliding bearing. Table 5 shows that such geometry does not lead to further reduction of the friction coefficient.

TABLE 5

| Position of the cavity [m] $B_1$ | Load [mPa] W/L | Friction [mPa] F/L | Dimless load W* | Dimless friction F* | Friction coeff. $\mu$ | Coeff. ratio $\mu/\mu_{2DRey}$ |
|---|---|---|---|---|---|---|
| $5 \cdot 10^{-6}$ | 353811 | 115.498 | 0.0147 | 0.577 | 3.264e−4 | 1.343 |
| $10 \cdot 10^{-6}$ | 333489 | 102.951 | 0.0139 | 0.515 | 3.087e−4 | 1.270 |
| $20 \cdot 10^{-6}$ | 325079 | 87.594 | 0.0135 | 0.438 | 2.694e−4 | 1.108 |
| $40 \cdot 10^{-6}$ | 322323 | 79.137 | 0.0134 | 0.396 | 2.455e−4 | 1.010 |

Figure 12:
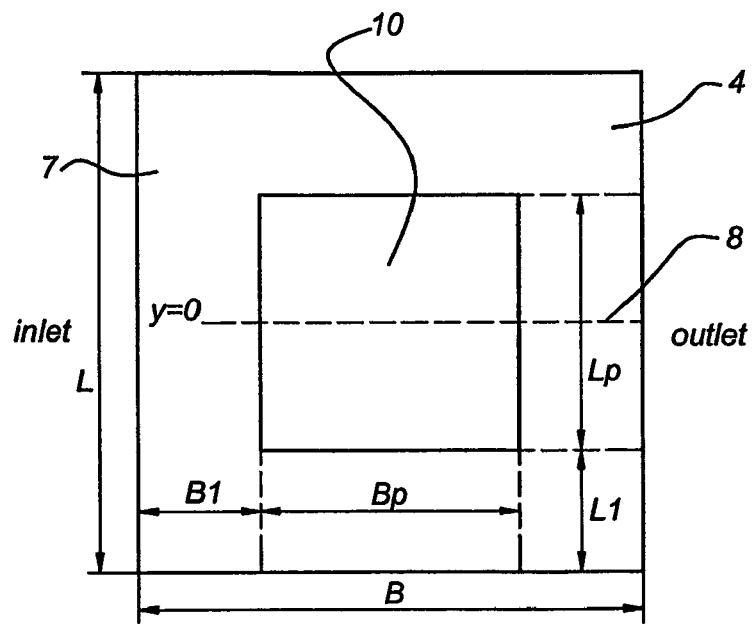
FIG. 12 shows a top view of the upper wall of a three-dimensional embodiment of the sliding bearing according to the invention.

The previous studies have all been related to two-dimensional cases. Subsequently, the behaviour of a three-dimensional linear wedge sliding bearing with a single cavity is studied. The lay-out in top view thereof is shown in FIG. 12. Reference L indicates the bearing width. $L_1$ defines the distance of the cavity 10 from the lateral boundary of the sliding bearing gap 6, $L_p$ defines the width of the cavity 10. The following magnitudes have been selected:

$$B=L=2\cdot 10^{-2} \text{ m}, B_p=L_p=1\cdot 10^{-2} \text{ m}, L_1=0.5\cdot 10^{-2} \text{ m}.$$

Figure 13:
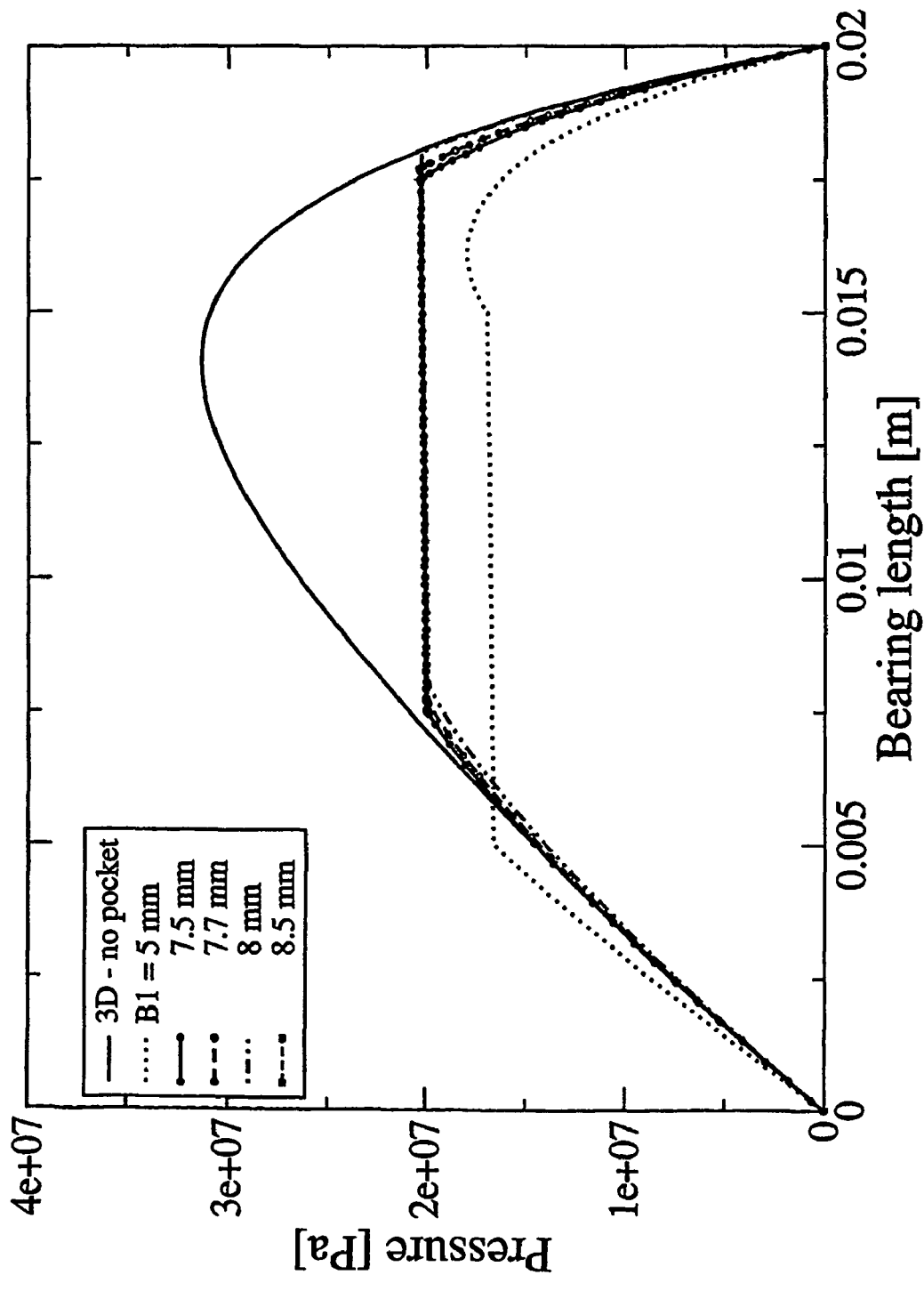
FIG. 13 shows a graph containing the pressure distribution along the lower surface of the sliding bearing according to FIG. 12, for y=0 m.

Table 6 shows the results of the varying distance $B_1$. The pressure distribution along the lower surface for y=0 m is shown in FIG. 13.

TABLE 6

| Position of the cavity [m] $B_1$ | Load [mPa] W/L | Friction [mPa] F/L | Dimless load W* | Dimless friction F* | Friction coeff. $\mu$ | Coeff. ratio $\mu/\mu_{2DRey}$ |
|---|---|---|---|---|---|---|
| 0 | 275882 | 150.011 | 0.0115 | 0.750 | 5.438e−4 | 1 |
| $5 \cdot 10^{-3}$ | 219692 | 118.527 | 0.0092 | 0.593 | 5.395e−4 | 0.992 |
| $7.5 \cdot 10^{-3}$ | 242436 | 116.481 | 0.0101 | 0.582 | 4.805e−4 | 0.884 |
| $7.7 \cdot 10^{-3}$ | 242467 | 116.192 | 0.0101 | 0.581 | 4.792e−4 | 0.881 |
| $8 \cdot 10^{-3}$ | 241370 | 115.671 | 0.0101 | 0.5784 | 4.792e−4 | 0.881 |
| $8.5 \cdot 10^{-3}$ | 234995 | 114.561 | 0.0098 | 0.573 | 4.875e−4 | 0.896 |

Figure 14:
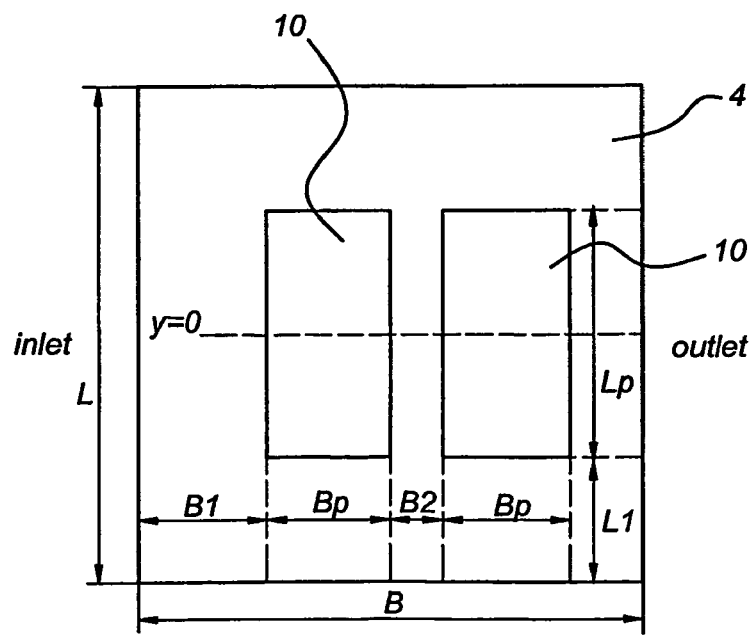
FIG. 14 shows a further embodiment with two cavities.

Finally, the embodiment of FIG. 14 has been studied in which two cavities of similar form and dimensions are applied. These dimensions are:

$$B=L=2\cdot 10^{-2} \text{ m}, L_p=2\cdot B_p=1\cdot 10^{-2} \text{ m}, L_1=0.5\cdot 10^{-2} \text{ m}.$$

Figure 15:
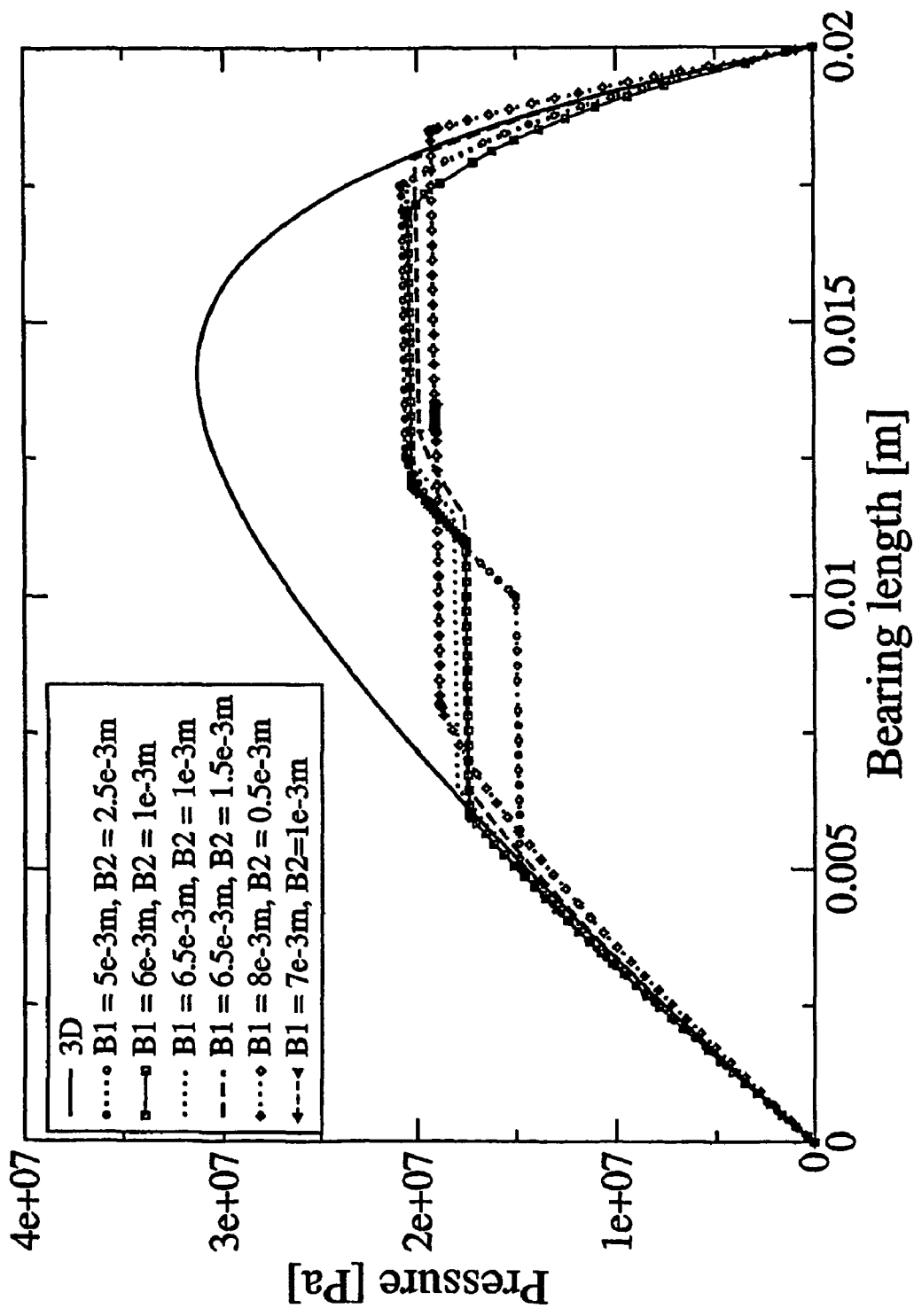
FIG. 15 shows a graph containing the pressure distribution for the embodiment of FIG. 14 along the lower surface for y=0 m.

Table 7 shows the results of varying distances $B_1$ and $B_2$, FIG. 15 the pressure distribution along the lower surface for y=0 m.

TABLE 7

| Position of the first cavity [m] $B_1$ | Gap between the pockets [m] $B_2$ | Load [mPa] W/L | Friction [mPa] F/L | Dimless load W* | Dimless friction F* | Friction coeff. $\mu$ | Coeff. ratio $\mu/\mu_{3D}$ |
|---|---|---|---|---|---|---|---|
| 0 | 0 | 275882 | 150.011 | 0.0115 | 0.750 | 5.438e−4 | 1 |
| $5 \cdot 10^{-3}$ | $2.5 \cdot 10^{-3}$ | 230303 | 117.07 | 0.0096 | 0.585 | 5.083e−4 | 0.935 |
| $6 \cdot 10^{-3}$ | $1 \cdot 10^{-3}$ | 236121 | 117.376 | 0.0098 | 0.587 | 4.971e−4 | 0.914 |
| $6.5 \cdot 10^{-3}$ | $1 \cdot 10^{-3}$ | 237723 | 116.784 | 0.0099 | 0.584 | 4.912e−4 | 0.903 |
| $6.5 \cdot 10^{-3}$ | $1.5 \cdot 10^{-3}$ | 234126 | 116.147 | 0.0098 | 0.581 | 4.961e−4 | 0.912 |
| $7 \cdot 10^{-3}$ | $1 \cdot 10^{-3}$ | 236597 | 116.021 | 0.0099 | 0.580 | 4.904e−4 | 0.902 |
| $8 \cdot 10^{-3}$ | $0.5 \cdot 10^{-3}$ | 233085 | 114.82 | 0.0097 | 0.574 | 4.926e−4 | 0.906 |

Although in the description given before as well as in the figures reference is made to a wedge with non-parallel bearing surfaces, the invention is also related to parallel bearing surfaces.

Notation h1 maximum film thickness (see FIG. 1)

$h_0$ minimum film thickness $h_3$ height of the cavity (see FIG. 2)

B bearing length

L bearing width

U velocity in the x direction of the bottom wall x,y,z Cartesian coordinates t time (s)

p pressure

ρ density

η dynamic viscosity

ν kinematic viscosity $\nu=\eta/\rho$

W total load

F total friction

W* dimensionless load

F* dimensionless friction

Main Values $B=2*10^{-2}$ m $U=1$ m/s $h_0=1*10^{-6}$ m $h_1=2*10^{-6}$ m $\rho=10^3$ kg/m3

$\eta=10^{-2}$ Pas $\nu=10^{-5}$ m$^2$/s

The invention claimed is:

1. Sliding bearing comprising two opposite bearing surfaces which enclose a gap containing a lubricant film, said bearing surfaces being moveable with respect to each other in a generally parallel fashion, at least one of said surfaces being provided with at least one cavity, said cavity having a depth which is larger than 10 times the lubricant film thickness, at least one of the length and width dimension of the surface area of said cavity being larger than 100 μm, wherein the sum of the surface areas of all cavities of one and the same bearing surface amounts to at least 15% of the contact area of the bearing surfaces.

2. Bearing according to claim 1, wherein at least one of the length and width dimensions amounts to at least 1000 μm.

3. Bearing according to claim 1, wherein at least one of the length and width dimensions amounts to at least 5000 μm.

4. Bearing according to claim 1, wherein the cavity depth is at least equal to 20 times the lubricant film thickness.

5. Bearing according to claim 4, wherein at least one of the length and width dimensions amounts to at least 5000 μm.

6. Bearing according to claim 1, wherein the cavity depth is maximally 50 times the lubricant film thickness.

7. Bearing according to claim 1, wherein the sum of the surface areas of all cavities of one and the same bearing surface amounts to at most 50% of the contact area of the bearing surfaces.

8. Bearing according to claim 1, wherein at least one of the surfaces has at least 4 cavities.

9. Bearing according to claim 1, wherein at least one of the surfaces has at most 8 cavities.

10. Bearing according to claim 1, wherein the gap between the bearing surfaces as seen in the direction of relative movement has an inlet and an outlet for the lubricant film, whereby a bearing length is defined between said inlet and outlet and said inlet and outlet being at a distance from any of the at least one cavity.

11. Bearing according to claim 10, wherein the center of a cavity or of a group of cavities is located at a distance of 0.6 to 0.8 times the bearing length from the inlet.

12. Bearing according to claim 11, wherein at least two cavities are provided, the distance between the formost cavity and the inlet being larger than the distance between the rearmost cavity and the outlet.

13. Bearing according to claim 10, wherein one and only one cavity is provided, said cavity being positioned approximately at equal distances from the inlet and the outlet.

14. Bearing according to claim 10, wherein at least two cavities are provided, the distance between the formost cavity and the inlet being larger than the distance between the rearmost cavity and the outlet.

15. Bearing according to claim 1, wherein a plurality of cavities is provided, said cavities are isolated from each other.

16. Bearing according to claim 1, wherein the lubricant film thickness under running conditions is in the range of 0.01 μm to 10 μm.

* * * * *